(12) United States Patent
Perry

(10) Patent No.: US 6,763,276 B1
(45) Date of Patent: Jul. 13, 2004

(54) METHOD FOR OPTIMIZING A CONTINUOUS COMPLEX SYSTEM USING A SET OF VERTICES AND DYNAMIC HIERARCHICAL CONSTRAINTS

(75) Inventor: Ronald N. Perry, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 763 days.

(21) Appl. No.: 09/604,318

(22) Filed: Jun. 27, 2000

(51) Int. Cl.[7] .............................................. G06F 19/00
(52) U.S. Cl. ................................ 700/97; 705/7; 705/8; 706/19
(58) Field of Search ....................... 700/97, 99; 705/7, 705/8; 716/2; 703/2; 706/19

(56) References Cited

U.S. PATENT DOCUMENTS

| | | | |
|---|---|---|---|
| 4,744,028 A | 5/1988 | Karmarkar | 364/402 |
| 4,924,386 A * | 5/1990 | Freedman et al. | 700/99 |
| 5,586,049 A | 12/1996 | Kurtzberg et al. | 364/499 |
| 5,630,070 A | 5/1997 | Dietrich et al. | 395/208 |
| 5,729,466 A * | 3/1998 | Bamji | 716/2 |
| 5,905,666 A * | 5/1999 | Hoffman et al. | 700/99 |
| 6,009,379 A | 12/1999 | Kurtzberg et al. | 702/84 |
| 6,014,505 A * | 1/2000 | Schorn | 716/3 |

* cited by examiner

Primary Examiner—Albert W. Paladini
(74) Attorney, Agent, or Firm—Dirk Brinkman; Andrew J. Curtin

(57) ABSTRACT

A method optimizes a system. Performances of design parameters of an objective function modeling the system are represented in a multi-dimensional search space. A set of vertices are positioned in the search space. Each vertex has an associated one of the performances. The vertices in the set are sorted in a worst to best performance order. Each vertex in the ordered set is moved to a next position if the performance at the next position is better than a current performance of the vertex. The sorting and moving are repeated in a cycle until a termination condition is reached.

26 Claims, 7 Drawing Sheets

METHOD FOR OPTIMIZING A CONTINUOUS COMPLEX SYSTEM USING A SET OF VERTICES AND DYNAMIC HIERARCHICAL CONSTRAINTS

FIELD OF THE INVENTION

The present invention relates generally to optimizing complex systems, and more particularly to optimizing continuous constrained complex systems.

BACKGROUND OF THE INVENTION

In a complex physical system, such as a power or chemical plant, various attributes, e.g., cost, profit, product, waste, quality, and efficiency, can be modeled by an objective function F(x), where x represents design (input) parameters that determine a performance (output) of the objective function. The design parameters define a search space, where each instantiation of x of the search space has a corresponding performance.

It is desired to optimize the performance of the system. This can be done by locating an optimum performance in the search space. Typically, optimization minimizes waste, and maximizes product, quality, and efficiency.

Due to engineering complexities, the design parameters may also have to conform to physically feasible limits called constraints C(x). The constraints can be dependent or independent of the objective function. For some design parameters, the performance may be infeasible.

In many complex physical systems the objective function and the constraints are non-linear, non-differentiable, and noisy. This makes it more difficult to optimize the objective function.

Formally, the optimization problem can be stated as follows. Maximize the objective function F(x) subject to constraints $C_i(x) \geq 0$, where x is a real-valued vector of design parameters $x_1, X_2, X_3, \ldots, X_n$ for all $x \in R^n$, and i=1, . . . , m. If function minimization is required, then multiply the objective function by negative one to recast the problem to function maximization. Similarly, any constraint in the form $C_i(x) \leq 0$ can be recast into the canonical form by multiplying $C_i(x)$ by negative one. In the following, the terms "better and worse" performance will be used to cover both maximization and minimization problems.

FIG. 1 shows an example chemical plant 100 in simplified form. Using a cooler 101 and a heater 102, the system separates product 103 and waste 104 from an input stream 105. The system includes a condenser 106, a reboiler 107, and reactive plates 108 in a distillation or fractionating column.

The objective function F(x) 110 that models the system 100 maximizes the amount of the product (P) 113, and minimizes waste (W) 114 for a particular input stream (I) 115. The design parameters 111, vector x, can include the rate of flow in the input, the heating and cooling rates applied, the liquid and vapor compositions of each component on each plate, and the vapor pressure.

The design parameters x are subject to restrictions or interrelations, i.e., constraints C(x) 116 of many kinds. For example, compositions and flows must be positive, temperatures must not exceed certain upper bounds. More complicated constraints indicate how components interact physically. For instance, vapor and liquid compositions are related by a highly non-linear function of temperature. Careful analysis of the system 100 allows one to generate the appropriate objective function F(x) 110 and constraints C(x) 116. The function F can then be optimized to maximize product and minimize waste under particular operating conditions.

Many constrained optimization functions are solved by searching for optima in the search space using an adaptive optimization method. Often the optima lie near constraint boundaries. Consequently, avoiding search in constrained space can hinder the optimization method's path to the optima.

The original idea for an adaptive optimization method was described by Box in "Evolutionary Operation: A Method for Increasing Industrial Productivity," International Conference on Statistical Quality Control, Paris, July 1955, reproduced in *Applied Statistics*, VI, pp. 3–22, 1957. Box developed an idea he called "evolutionary operation." Evolutionary operation pertains to an empirical optimization of full scale processes, subject to errors in observations. The basic idea is to replace the static operation of a process by a continuous and systematic scheme of slight perturbations in the control parameters. The effect of these perturbations is evaluated and the process is shifted in the direction of improvement. Box was interested in increasing production by systematically adjusting process parameters that affect output. His idea for evolutionary operation was more related to an operational procedure which a plant manager might follow than it was to optimization with a computer system.

In 1962, Spendley et al., in "Sequential Application of Simplex Designs in Optimization and Evolutionary Optimization," *Technometrics*, November 1962, applied a simplex method to the problem of non-linear numerical optimization. This simplex method should not be confused with the simplex method for linear programming.

A simplex is a geometric construct that has one more vertex than the number of dimensions in the search space. If k is the number of dimensions in the search space, then the simplex is defined by k+1 vertices in that search space. As shown in FIG. 2, a simplex in two dimensions is defined by three vertices. In one, two, and three dimensions, the simplex is respectively a line, a triangle, and a tetrahedron. In complex systems, the dimensionality of the search space can be quite large, for example, twenty or more. The lines connecting the vertices are used to visualize the simplex. They have no other function. Each vertex is a graphical representation of one of the objective function's constraint relations and an associated performance of F(x) that determines its relative worth to the simplex.

A simplex process locates an optimum of the objective function F based on the movement of the simplex through the search space. The simplex is driven through a sequence of logical moves based on the performance evaluated as each vertex, and the orientation of the simplex. While the simplex is moved, it can adaptively change in shape as the spacing and curvature of the contours of the search space defined by the objective function F change.

As shown in FIG. 3, the basic simplex method 300 is easy to understand and apply. The optimization begins with initial trials. The trial conditions are spread out evenly. The number of initial trials is equal to the number of design parameters plus one. The initial trials form the first simplex.

The basic simplex method has the following rules. The first rule rejects the trial with the worst performance in the current simplex. A next performance value is determined, by reflection 320 into the search space opposite the undesirable result. This next trial replaces 330 the worst trial in the simplex. This leads to a next worst performance in the simplex that, in turn, leads to another next trial, and so on. At each step, one moves away from the worst performance. By that, the simplex moves steadily towards a better performance.

The second rule never returns to the performance that has just been rejected. The calculated reflection in the search space can also produce a worst performance. Without this second rule the simplex would just oscillate between the performance values. This problem is nicely avoided by choosing the second worst performance and moving away from it.

Besides these two main rules, two additional rules are also used. Trials retained in the simplex for a specified number of steps are reevaluated 340. In the presence of noise, where identical design parameters give different performance values, the reevaluation rule avoids the simplex from getting stuck around a false worst performance. Trials never cross a constraint boundary of the search space. Instead, a very unfavorable performance is applied, forcing the simplex to move away from the constraint boundary.

A modified simplex method can adjust the shape and size of the simplex depending on the response in each step. This method is also called the variable-size simplex method. Several new rules are added to the basic simplex method rules. These new rules expand the simplex in a direction of better performance, or contract the simplex when a move was taken in a direction of worse performance. The procedures for expansion and contraction enable the modified simplex both to accelerate along a successful path of improvement and to hone in on the optimum. Therefore the modified simplex will usually reach the optimum performance quicker than with the basic method and pinpoint the optimum performance more closely.

Nelder et al., in "A Simplex Method For Function Minimization," *Computer Journal*, Vol. 7, 1965, developed a computerized method to perform optimization using a simplex constructed of n+1 vertices to search an n-dimensional search space, also see Gill et al. in *Practical Optimization*, Academic Press, London, 1981.

The Nelder simplex method differs from most of the then available optimization methods because it is not based on gradients or quadratic approximations of F(x). It is an opportunistic method that assumes that an objective function is defined and that there is some optimum in the search space. The Nelder method does especially well when curvature of the search space is changing rapidly. It is relatively slower around maxima where the search space is smoother and derivative methods work faster. The Nelder method does not explicitly handle constraints. However, the method has since been adapted to handle constraints by the use of penalty functions.

The penalty function adds a penalty value to the performance of the objective function when constraints are encountered. Unfortunately, this penalty changes the actual value of the objective function and thus changes the "shape" of the true unconstrained search space. In effect, as further described below, the penalty function "warps" the search space near constraint boundaries. This makes it very difficult to locate an optimum near or at the boundary. Of course, in many practical systems, this is exactly where one would expect to find optimum performance. It is well known that any highly tuned system runs on its "edges."

The nature of a constrained problem significantly effects the logic of the optimization process. Box, in "A New Method of Constrained Optimization and Comparison With Other Methods," *Computer Journal*, Vol. 8, pp. 42–54, 1966, describes a "complex" method. The complex method is a modified simplex that handles constraints.

This transformation is not trivial, however, because constrained optimization is significantly different from unconstrained optimization. Therefore, in developing a constrained version of the simplex method, Box changed most of the details of the method, leaving only the basic principle of reflecting the worst of a collection of vertices. In the new process, constraints are evaluated and dealt with differently than they are in methods using penalty functions.

Instead of using a penalty function, Box uses a constrained performance that is separate from the objective function itself. The constrained performance has a different functional meaning or value than the unconstrained performance. However, the constrained performance can be optimized just the same.

Box defines a constraint whose boundary is easily identified (e.g., $x_2 \geq 7$) and whose evaluation is independent of the objective function F an independent or explicit constraint. In contrast, a dependent or implicit constraint has a complex boundary and requires an evaluation of F. Box attempts to stay very close to a constraint boundary by setting independent parameter violations just inside the constraint limit. If a dependent constraint is violated, the test vertex is moved ½ way towards the centroid. From his results, Box concludes that "in constraint bound problems, the constraints are of as much importance as the contours and gradient of the objective function."

One problem with the prior art simplex and complex methods is that they tend to lose dimensionality due to concentrating on the vertex with the worst performance. This tendency for the vertices to "line-out" reduces their ability to move about the search space.

Therefore, it is desired to provide an optimization method that is able to operate without losing dimensionality. Furthermore, the method should be able to locate optima near a constraint boundary. In addition, the method should be applicable to global optimization problems where many local optima exist, and the method should be able to adapt to dynamically changing environments, for example, in a real time control system.

SUMMARY OF THE INVENTION

Provided is an optimization method that, unlike those of the prior art, utilizes a constrained space to help locate an optimum. The rationale for this implementation is that many optima lie near constraint boundaries. The strict avoidance of constrained space, as in the prior art, can hinder a search for the optimum. In the present method, vertices of a set are allowed, and sometimes encouraged, to move into the constrained space, unlike the methods of the prior art, where constraint violations are prohibited or severely penalized.

A discontinuity at a constraint boundary is handled by partitioning the performances of the search space into any number of unique levels. The partitioning is done by grouping the constraints into one or more hierarchical levels. Each vertex is then evaluated according to the group of constraints in each level, beginning with the lowest level. If the vertex evaluates to a negative performance, than the first level and its negative performance is assigned to the vertex. If not, then the vertex is evaluated at the next level, and so forth. Only if the vertex still has a non-negative performance after all levels of constraints have been considered is the objective function evaluated. This effectively partitions the search space into a plurality of levels.

The manner of partitioning differs from Box's explicit-implicit categorization. The present method defines a constrained performance for each level of constraints that is independent of a feasible objective function. Furthermore, the grouping of the constraints can dynamically be changed during the search for the optimum performance.

The constrained performance for a particular level of constraints is some combination of the violated constraints in that level, for example, the sum. A constraint is considered violated when its value is strictly less than zero. Therefore, by definition, the sum of the violated constraints is negative and will be maximized towards the positive or feasible direction.

In conjunction with the multiple levels of performances, the present method defines a set of rules concerning the ordering and movement of the set of vertices as they straddle a constraint boundary. These rules and the multiple levels of constrained performances make the present method less sensitive to constraint discontinuities, and can significantly aid motion along a constraint boundary toward an optimum.

In addition to the new constraint handling techniques, the method is improved so that loss of dimensionality is reduced. One problem with the adaptive simplex process of the prior art is that it tends to lose width in one spatial dimension. This loss of dimensionality then restricts motion in that direction. The present method attempts to move every vertex before resorting the set of vertices. Both the simplex and complex methods of the prior art concentrate exclusively on the present worst performance vertex.

More particularly, provided is a method that optimizes a system. Performances of design parameters of an objective function modeling the system are represented in a multi-dimensional search space. A set of vertices are positioned in the search space. Each vertex has an associated performance. The vertices in the set are sorted in a worst to best performance order. Each vertex in the ordered set is moved to a next position if the performance at the next position is better than a current performance of the vertex. The sorting and moving are repeated in a cycle until a termination condition is reached.

DETAILED DESCRIPTION OF THE PREFERRED EMBODIMENT

Optimizing Search Data Structures

Figure 5:
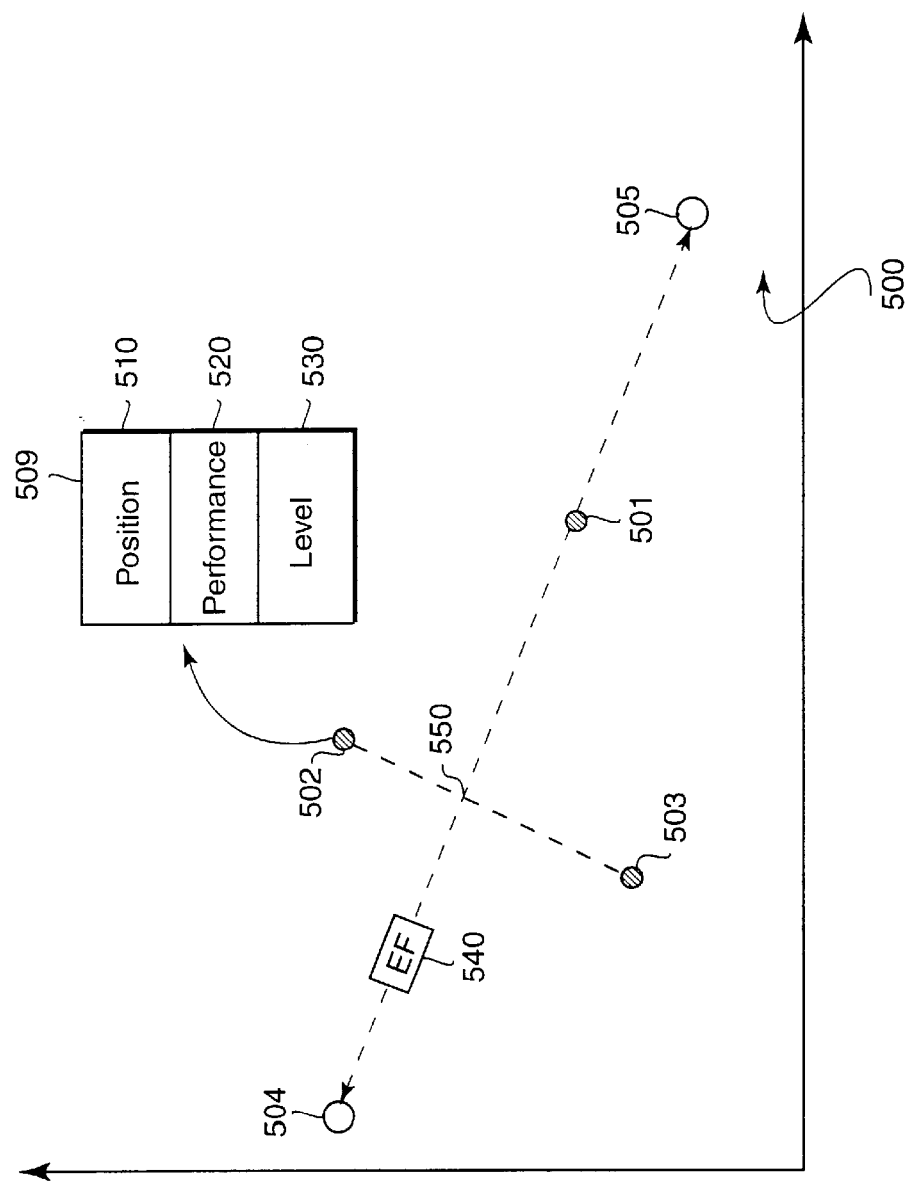
FIG. 5 is a graph of an expanding set of vertices.

My invention provides an improved method for adaptively optimizing a constrained objective function defined over a continuous search space. As shown in FIG. 5, an n-dimensional objective function F defines an n-dimensional search space 500. I define a set of n+1 vertices. In FIG. 5, the vertices are 501–503.

In a practical application, each vertex is stored as a data structure in a computer memory as a data element 509. Hereinafter, operations on these data elements are to be construed as operations on their logical equivalent vertices. The objective function and each constraint can be a computer process that provides feasible, and perhaps, infeasible performance values for the array of data elements that represent my set of vertices.

Array Vertices with Positions, Performances, and Levels

Each element 509 of the array stores the following information: a position having coordinates 510, a performance 520, and a level 530. The coordinates of the position defines the location of the corresponding vertex in the search space 500. The performance defines a value of the system being optimized at the vertex's position. How the performance is determined is described in greater detail below. The performance can be feasible, or in the case when the position of the vertex violates one or more constraints, the performance can be infeasible. The use of the level value is also described below. Briefly, the search space can be dynamically partitioned, and each partition can have an associated unique hierarchical level. The partitioning is effected by grouping the constraints and the objective function.

Moving Vertices

My method moves the vertices in the search space in such a way that the performance of the objective function is optimized. The movement of the vertices can be subject to constraints. As described in greater detail below, the way that I deal with constraints distinguishes my improved method from adaptive optimization methods of the prior art.

Moving an unconstrained vertex, other than the vertex with the best performance is done as follows. The vertex is reflected through the centroid 550 of the remaining vertices. For example, the vertex 504 is a new reflected position of vertex 501. The distance that the vertex moves past the centroid is equal to the distance from the original location of the vertex to the centroid times some expansion factor (EF) 540, e.g., 1.25.

The movement of the vertex with the best performance is described under the special rules section below. It should be noted, that any vertex of the set can become the best performing vertex at any time if during a trial move it betters the current best performance. Therefore, one vertex in the set is always marked as the vertex with the best performance.

A move is deemed successful when the performance of the vertex at the next position is better than the performance of the vertex at its old position, i.e., vertices are only allowed to move to locations in the search space that have better performance. If the move is successful, then the next position and next performance replaces the original position and the original performance of the vertex. Otherwise, the move is discarded, and the vertex remains at its original position.

Cycle of Moves

A cycle of moves constitutes attempting to move each vertex of the set to better the performance of the vertices. The vertices are moved in order of increasing or better performance. Specifically, the vertex with the worst performance is moved first, and the vertex with the best performance is moved last. Because of the expansion factor, the vertices will tend to disperse in their relative positions. That is, the spatial extent of the set increases with each successful move.

If the performance of the best vertex is unchanged during a cycle, then the other vertices are moved toward the best vertex, by a contraction factor (CF), e.g., 0.75. That is, the spatial extent of the set decreases.

Because the vertex set is adaptive, it tends to elongate towards areas in the search space that have higher performance, see the description of FIG. 4 below. Thus, the search is more vigorous in the direction of past successes, which usually holds the most promise for future success as well. However, this tendency to elongate must be tempered, otherwise the vertices could "line-out" with a reduced dimensionality thereby disabling the vertex set from properly maneuvering and covering the search space completely.

Adaptive Search Method

Figure 6:
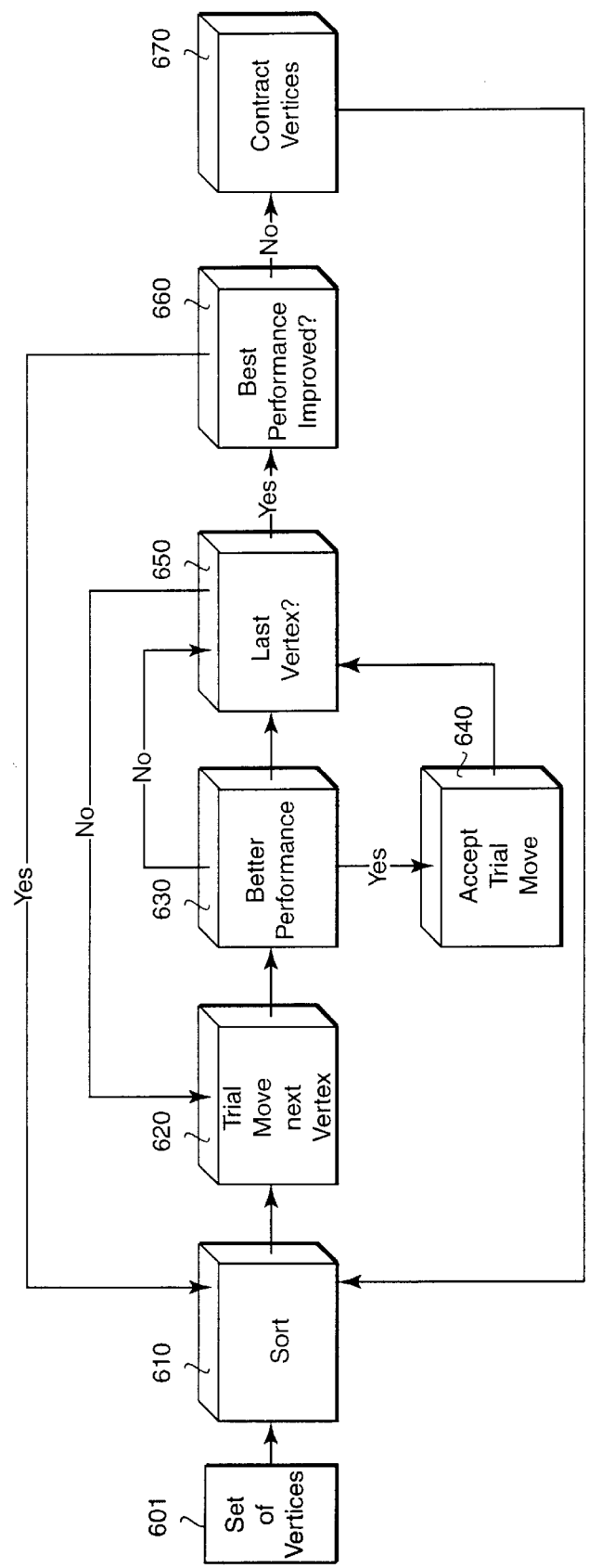
FIG. 6 is a flow graph of a method according to the invention.

FIG. 6 shows the basic steps of my method 600. A set of vertices 601 is evaluated according to their positions in the search space 500, and sorted 610 according to an increasing order. Here, an increasing order means worst to best, regardless whether the optimization is a maximization or a minimization problem. In other words, in a maximization, a maximum value is the best, and in a minimization, a minimum value is the best.

The vertices are trial moved 620 in increasing order of their performance (worst to best). A trial move means conditionally moving a vertex to a next position, and then evaluating the vertex at the next position. A better performance 630 at the next position results in accepting the trial move 640. Following the worst vertex, the next worst vertex is conditionally moved, tried, and accepted, and so on, until the last vertex of the set is conditionally moved, tried and accepted. As stated above, at the end of a cycle, the last vertex may no longer be the best vertex.

After a complete cycle 650 of conditionally moving, trying, and accepting each vertex, if the overall best performance 660 has not improved during the cycle, the vertices, other then the best vertex, are contracted 670 towards the best vertex according to the contraction factor, and the cycle is repeated until some predetermined termination condition is reached, e.g., a fixed number of iterations, or the incremental improvement (rate of change) in the optimization is less than some threshold value. Contracting decreases the spatial extent of the set of vertices.

Figure 1:
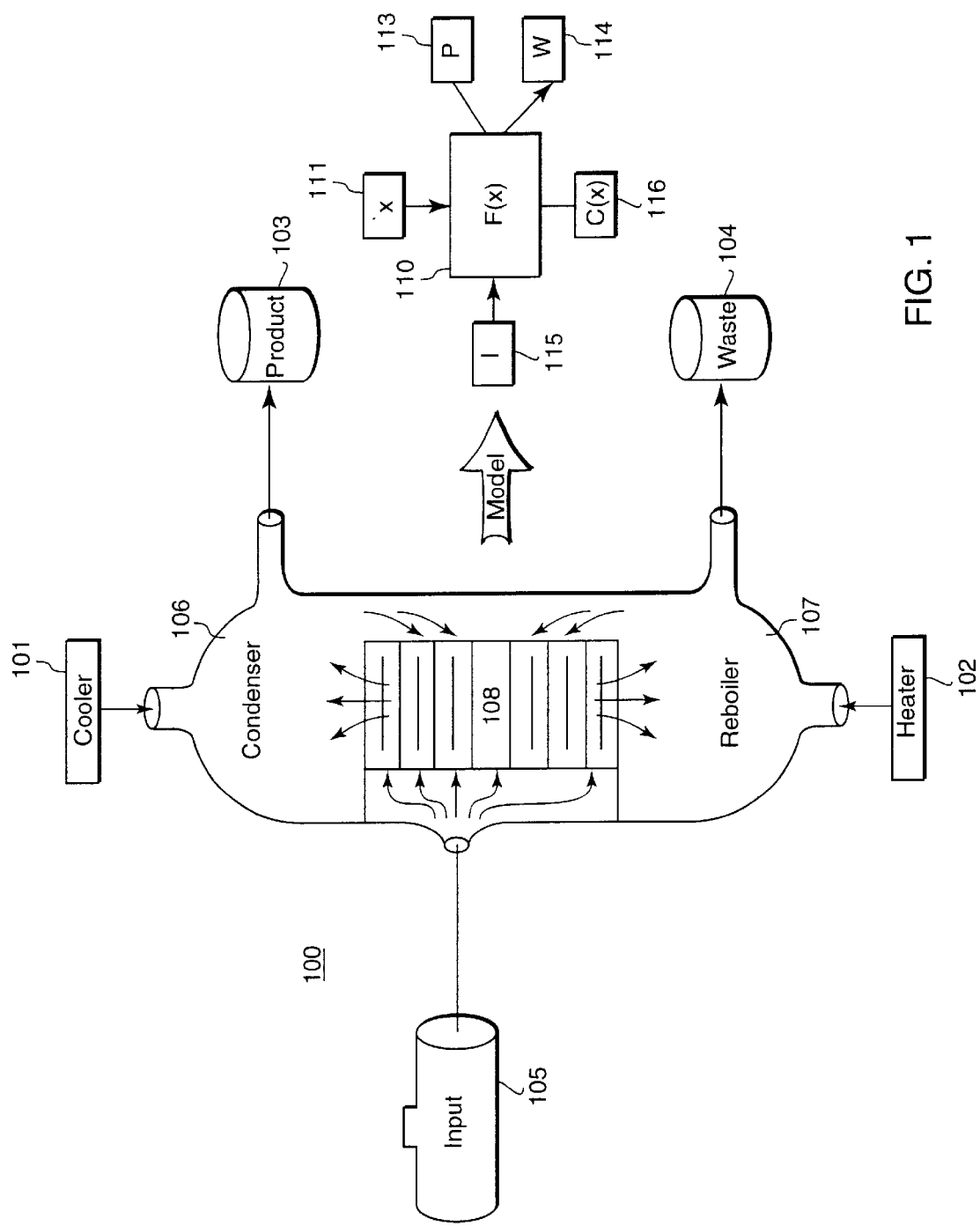
FIG. 1 is a diagram of a system and model to be optimized according to the method of the invention.
Figure 2:
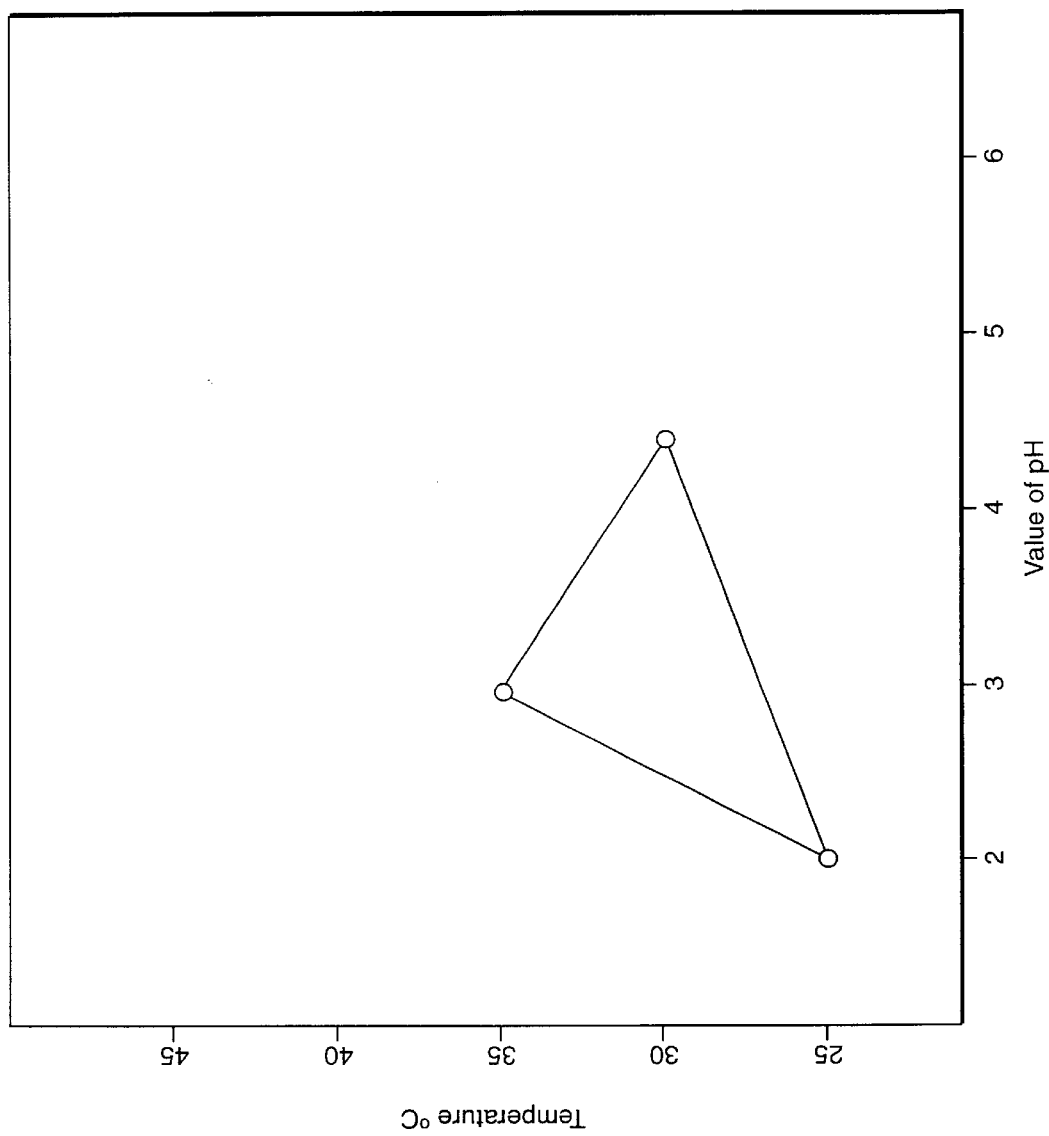
FIG. 2 is a graph of a search space and a simplex.
Figure 3:
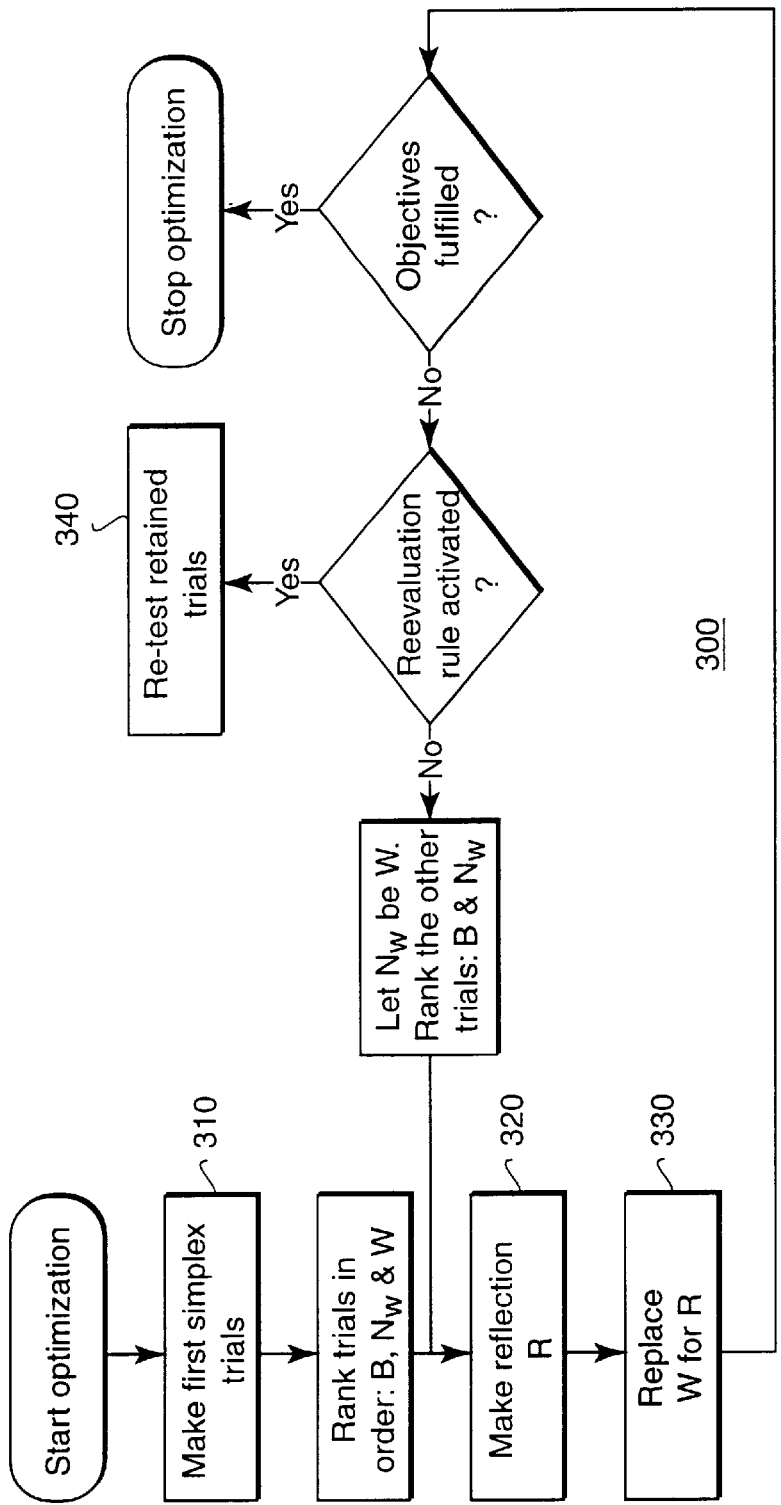
FIG. 3 is a flow graph of a simplex method.
Figure 4:
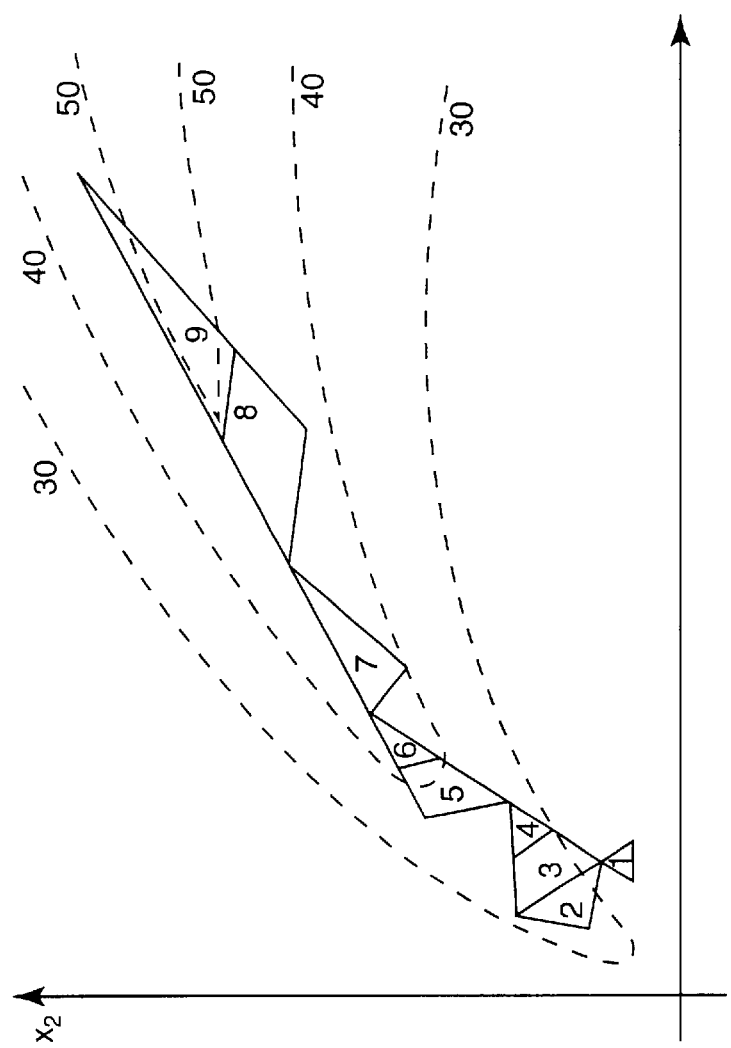
FIG. 4 is a graph of a set of vertices moving through a search space.

FIG. 4 shows nine moves (1–9) of a triangular set of vertices in a two-dimensional search space according to the present invention. Note that triangles 3–4, 5–6, and 8–9 overlap. Also, note the expansion towards the optimum, and then the contraction around the optimum.

As noted earlier, prior art simplex and complex methods for adaptive optimization have a tendency to lose width in one spatial dimension because those methods concentrate exclusively on the vertex with the worst performance. In contrast, I attempt to move every vertex in the set, from worst to best, thus, the tendency to lose dimensionality, as in the prior art, is reduced.

Although the set of vertices remains relatively insensitive to the value of the contraction factor, expansion factors of only slightly greater than one provide the best stability, especially in search spaces of a higher dimensionality, e.g., n>20. In addition, if the dimensionality of the search space is large, e.g., n>20, optimization can be improved by increasing the number of vertices.

Generating an Initial Set of Vertices in the Search Space

Vertices are initially generated in the search space as follows. A single base vertex is defined at some arbitrary position in the search space, it does not matter where. Additional vertices are generated by incrementing each coordinate of the base vertex by an appropriate step size. The step sizes are scale factors which help to give the set a sense of how big the search space is in each coordinate direction. That is, the step size is proportional to some small fraction of the size of a particular dimension.

Special Rules

If in the course of a cycle, the vertex to be moved is the vertex with the best performance, then the best vertex is reflected to a next position 505 that is away from the centroid 550 of the remaining vertices, rather than through it, as shown in FIG. 5. The distance that the best vertex is moved is equal to the distance from the best vertex to the centroid times the expansion factor 540. This accelerates the optimization process. It should be noted that during a cycle, the vertex with the best performance at the beginning of the cycle is not necessarily the best at the end of the cycle, because some other vertex could have improved its performance.

If the set of vertices contracts over a predetermined number of successive cycles, e.g., ten, then the set is regenerated at its current size. The current size for each coordinate of the search space can be computed as the difference between a corresponding coordinate of the set with the largest value and a corresponding coordinate of the set with the smallest value. Next positions of vertices are derived, as described above, from the vertex with the best performance using the current sizes for each coordinate instead of the step sizes for each coordinate. This helps to restore the dimensionality of the set where the vertices have become aligned.

The same procedure can be used when the set contracts to a size so small that it is no longer moving significantly. When this occurs, the regeneration can be done using the original step sizes of the set or by increasing the current size in each coordinate direction by some boost factor (e.g., 1.5). If the set continues to shrink, then it most likely is converging to an optimum.

Constraint Handling

So far I have described my method in terms of an unconstrained system. However, as stated above, most practical optimization problems are "constrained." They are constrained because not all performances associated with the design parameters result in a feasible performance. For example, most chemical plants have temperature, pressure, capacity, and time constraints, to name but a few.

A constraint $C_i$ is violated when its associated "performance" is negative. Thus, the constraint $C_1 = x_2 - 5$ states that the design parameter $x_2$ must be greater than or equal to 5 in order for the constraint's performance to be considered feasible, otherwise the performance is infeasible.

Partitioning of the Search Space

In one embodiment, I partition the search space into three types of spaces: an independent constrained space, a dependent constrained space, and the unconstrained space of the objective function. In other words, the partitioning is due to the grouping of the constraints from low level independent constraints, to higher level dependent constraints, and then to the highest level unconstrained objective function.

Performances of vertices in the independent constrained space are determined by summing the performances of violated (negative) independent constraints. Independent constraints are independent of the objective function, and depend only on the design parameters.

Performances of vertices in the dependent constrained space are defined by summing the performances of the violated (negative) dependent constraints. The dependent constraints require some preliminary calculations involving the design parameters and can often require an objective function evaluation.

Of course, performances in the unconstrained space are derived directly from the objective function.

Figure 7A:
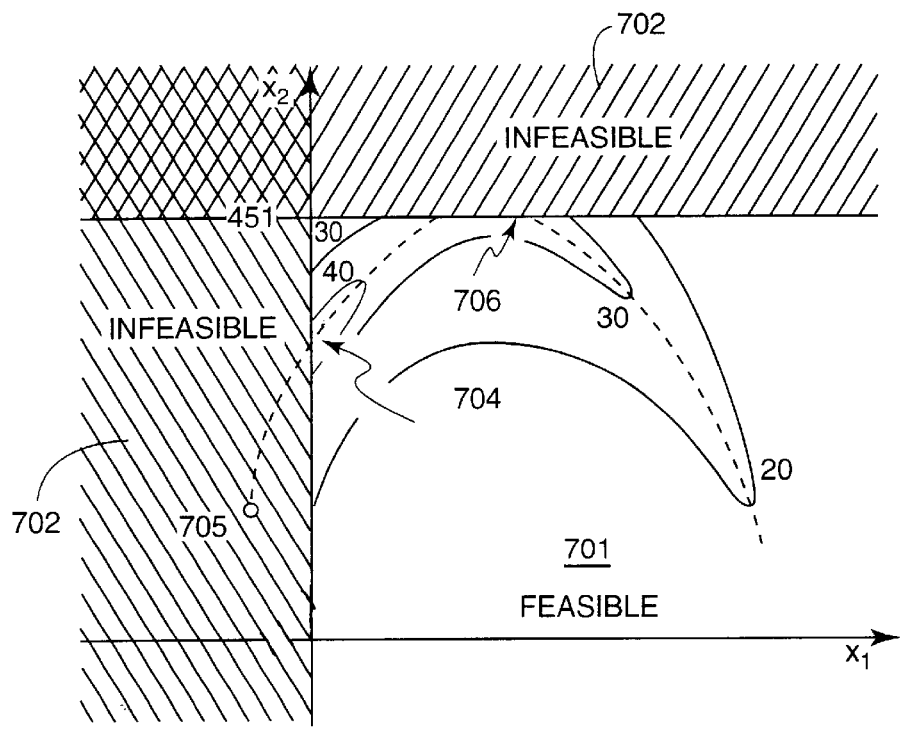
FIGS. 7a–b are graphs of a partitioned search space with feasible and infeasible regions.
Figure 7B:
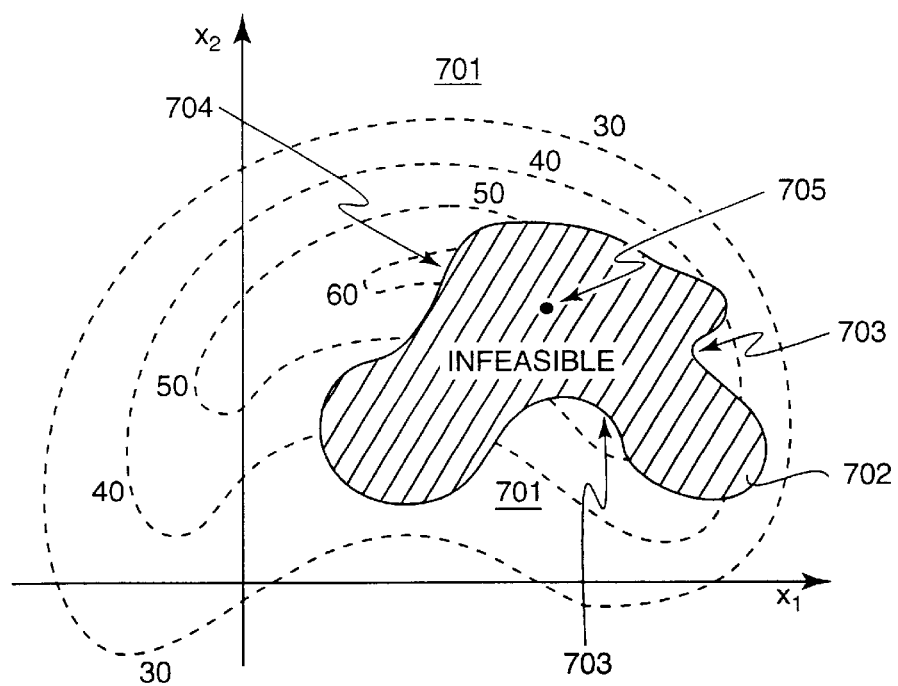

As shown in FIGS. 7a–b, the unconstrained space is normally referred to as the "feasible" performance region 701, as distinguished from the constrained (dependent or independent) or "infeasible" performance region 702. Below, with respect to the most general case, I will describe how "feasible" and "infeasible" performances are relative.

FIG. 7a shows two simple independent constraints $x_1 \geq 0$ and $x_2 \leq 451$, and FIG. 7b shows a complex dependent constraint. The Figures also show local optima 703, constrained global optima 704, unconstrained global optima 705, and a false optimum 706. Notice that some of the optima are near or at the constraint boundaries, as one is likely to find in real high performance systems.

Performances of independent constraints are easy to evaluate, as they are simply limits on the design parameters, such as:

2.0 meters$\leq$radius$\leq$5.0 meters (radius is the parameter)
0 kilos$\leq$weight$\leq$200 kilos (weight is the parameter)

Performances of dependent constraints, on the other hand, require some preliminary calculations and can often be defined by functions of the objective function. The practical significance of this distinction is that the performances of the independent constraints may be partitioned and evaluated separately from the performances obtained from the objective function. In fact, it is common to encounter performances of design parameters for which the objective function may be undefined or yield physically meaningless performances. Examples would be negative weights or negative areas. Thus, it is important to ensure that all constraints are satisfied before the objective function itself is evaluated.

Therefore, if a vertex is in the infeasible region 702, then the performance of the vertex is the sum of the (negative) performances of the violated constraints. This negative performance is maximized to encourage the vertex to move to a better performing position. Specifically, the vertex will only be moved if the performance is improved, that is, it becomes less negative or positive, or moves to a better search space partition, e.g., the vertex moves from the independent constrained space to the dependent constrained space. This increases the likelihood that the vertex will eventually move back to the feasible region 701.

Even if the vertex successfully moves from the independent constrained space, it's next position may still be in violation of one or several dependent constraints. In such a case, the performance of the vertex is the sum of the performances of the violated dependent constraints. Once again, this performance is maximized to encourage the vertex to move to a better performing position.

In this case, vertices in the independent constrained space have performances that are regarded as "infeasible" relative to the performances of vertices in the dependent constrained space, and performances of vertices in the dependent constrained space are regarded as "feasible" relative to performances of vertices in the independent constrained space. Furthermore, the performances of vertices in the unconstrained space are regarded as "feasible" relative to the performances of vertices in both the independent and dependent constrained spaces.

Constraint Boundaries

As is well known, the constraint boundary, or interface between the feasible and infeasible regions, oftentimes presents an optimization method with formidable problems. The main difficulty is one of keeping the optimization search feasible without causing any sharp discontinuities at the constraint boundaries. It will become apparent, that the vertices of my improved method are unique in that they are quite oblivious to discontinuities at constraint boundaries.

Interior and Exterior Penalty Functions

As stated above, one prior art solution forces search space continuity by defining a penalty function such that the feasible performance space is "warped" in the vicinity of the constraint boundary. The value of the penalty increases as the constraint boundary is approached. The penalty function can include an interior and exterior penalty function. The interior penalty function penalizes the performance as the constraint boundary is approached from the feasible region. In effect, the addition of the penalty function as an additional term on the objective function "warps" the performance surface near the constraint boundary. The "exterior" penalty function adds a penalty only after the constraint boundary has been crossed, and in increasing amounts as the optimization search ventures further into the infeasible region. Exterior penalty functions have no impact on the performance of vertices in the feasible region.

Prior art penalty functions are usually defined as some function of the constraints, such as the sum of the constraints squared times a scale factor. The penalty is added to the performance of the objective function effectively warping the search space to steer the set of vertices towards a feasible optimum.

There are several problems with the prior art penalty function approach. The most obvious problem is that by warping the search space, the optimum can be relocated. The warp can also cause very difficult terrain with sharp ridges. Difficult terrain hinders most conventional optimization search processes. Because of this, the penalty function is usually applied gradually over several stages, starting with a relatively small penalty that increases incrementally.

However, if the optimum lies on or near the constraint boundary, as is often the case in a real system, this approach must often be iterated many times in order for the optimization routine to effectively "hone in" on the true optimum.

Exterior penalty functions are sometimes more effective than interior penalty functions because they only warp the infeasible region. Exterior penalty functions, however, may have a more difficult time of forcing the optimization search to keep to the feasible side of the constraint boundary. In the event that the objective function is undefined in the infeasible region, the exterior penalty function cannot be used.

As an advantage, my method does not use penalty functions that warp the search space near the constraint boundary.

Penalty Free Method

I provide additional move rules to allow vertices of my set to converge to optima near or on the constraint boundary. Specifically, my rules allow vertices to move along the boundary, or even cross the boundary into an infeasible region. Sometimes, this boundary crossing into the infeasible region may even be encouraged to later find a better optimum in the feasible region.

In order to implement these additional rules, I mark the vertex with the worst performance in each partition and the vertex with the best performance in each partition. Furthermore, I mark the vertex with the overall worst performance of the set of vertices and the vertex with the overall best performance of the set of vertices. Partition based marking requires more computation but leads to a less aggressive search, while global based marking requires less computation but leads to a more aggressive search.

If all vertices of the set are in the same partition, i.e., either the independent, dependent, or unconstrained space, then moves are made according to the method of FIG. 6, along with the special rules described above.

If some of the vertices are in different partitions, then a vertex at a lower level partition can only move to a higher level partition if its performance is better than the vertex with the best performance in the higher partition. This allows my vertex set to smoothly move along the constraint boundary in the direction of the feasible optimum. This is not possible with the prior art techniques, which oscillate wildly near the constraint boundary. The search can be made more aggressive by only allowing this move if the performance of the vertex becomes the overall best performance.

Vertices in a particular partition move only through the centroid of other vertices in the same partition or higher level partitions, thus the vertices in the lower level partitions are not considered in the centroid calculation. This gives my improved method a better sense of direction along the "feasible" side of the constraint boundary. If there are less than two vertices in the same or higher partitions, then other vertices in the lower partitions can be considered in the centroid calculation.

A vertex in a higher level partition may move freely, without regard of normal performance criteria, to a lower level partition, so long as the performance of the vertex at the next location is better than the performance of the worst vertex in the lower level partition. The search can be made more aggressive by only allowing this move if the performance of the vertex becomes better than the vertex with the overall worst performance. Note, however, that the vertex with the best performance of the set must always better its performance before it is allowed to move. This gives my improved method the ability to "straddle" and track a constraint boundary.

If a set of vertices is contracted because the overall performance is not improved in a cycle, then vertices in a lower partition than the partition containing the overall best vertex are over-contracted. This means that these vertices move past the vertex with the overall best performance rather than towards it. This helps these lower level vertices to cross the constraint boundary towards feasibility.

This approach to handling constraints is fundamentally different from the penalty function method and other approaches known in the prior art. Instead of modifying the search space, my method lets the optimization search deal directly with an undistorted constraint boundary, thus requiring no "add-on" penalty function feature.

Unique Hierarchical Levels of Performance

When using the fixed independent-dependent constraint partitions as described above, each evaluation is defined by two indicators: a level, and a performance as indicated in Table A, and shown in the data element 509 of FIG. 5.

TABLE A

| Level | Type | Performance Function |
|---|---|---|
| 1 | Independent | Sum performances of violated independent constraints |
| 2 | Dependent | Sum performances of violated dependent constraints |
| 3 | Feasible | Objective function F(x) |

To determine the performance 520 of a vertex, both the level and performance can be considered. A hierarchy, from bottom-to-top, is defined first by levels and then by performances within a level: independent level, independent performance, dependent level, dependent performance, feasible performance.

The performance of two vertices is first compared according to their levels. Specifically, the vertex in a partition with a higher level is always the "better" vertex. Furthermore, if the vertices are at the same level, their performances 520 can be compared directly to determine the better vertex.

Generalized Constraint Levels

With generalized constraint levels, the objective function and the constraints are arbitrarily grouped. Each group has an associated hierarchical level. Evaluation of vertices is then done according to the hierarchical groups. This partitions the search space. For example, there can be more than three groups and three levels, causing more than three partitions. In many applications, a larger number of partitions provides advantages over the fixed independent-dependent-unconstrained partitions. Furthermore, the ability to change the partitions and levels while searching allows for dynamic and adaptive search techniques.

In this case, the groupings can be changed by the user, via some user interface, or automatically by the search process itself. Such an adaptive process can initially assign performances of each constraint and the objective function to its own partition and level and then later reassign the levels to, for example, "very active," "active," "not so active, and "inactive" partitions, as the search progresses. It is also possible to change the level of a partition without changing the partition itself.

Regardless of the type of search process for an optimum, e.g., steepest ascent gradient, conjugate gradient, variable metric, and sequential quadratic programming, see Press et al. in *Numerical Recipes in C*, Cambridge University Press, 1992, the way in which the performance of a vertex is evaluated will determine the decisions that are made and inevitably the path to the optimum. Due to the sequential nature of optimization techniques, any decision alterations imply a different path. The more flexible the search process is, the more possible paths it can follow, and, therefore, the better the chances the search process has of reaching an optimum.

When constraints are "active," ranking and grouping of constraints with my generalized constraint level method can have a strong effect on changing a search process' path, thereby aiding in finding a solution and in improving the performance of the system.

The optimization methods described herein work with all types of objective functions and constraints. However, my method is more efficient and robust than those of the prior art when either the objective function F or any constraint $C_i$ is highly non-linear or non-differentiable, or noisy. Most real-world practical systems, for example, a chemical plant, are subject to noise during control, where repeated evaluation of F or C, for identical design parameters, will often give different performances.

The prior art methods concentrate exclusively on the vertex with the worst performance. As a result, those methods have a tendency to lose width in one spatial dimension. This loss of dimensionality restricts searching in that direction, thus leading to difficulties in finding a solution.

My method trial moves all vertices before reordering the set. Consequently, the effect of my improved method is a more robust search that yields better performance. Furthermore, by grouping constraints and applying the described rules, my method can better find optima near constraint boundaries, the typical situation in highly tuned systems. Additionally, my method permits the constraints to be dynamically changed in response to real-time changing conditions, thus further enabling new paths to a more optimal performance.

Global Optimization

So far I have described "greedy" search techniques to find local optima. A known problem with greedy searches is that there may be a better optimum elsewhere in the search space. My search method can be applied to global optimization problems by making the search less greedy. Here, the goal is to determine a global optimum among typically many local optima.

This can be achieved by applying a global search strategy, such as simulated annealing, see Press et al. in *Numerical Recipes in C*, Cambridge University Press, 1992.

I use a probability P of acceptance which determines whether or not the current vertex is replaced by a next vertex. If the next vertex provides a better performance, then P=1, otherwise, P>0. In the latter case, the probability of acceptance P is a function of the performances of the current vertex and the next vertex, and an additional control parameter, a "temperature" T.

In general, the lower the temperature T, the smaller the probability for accepting the next vertex. While performing the search, the temperature T is lowered in steps. In other words, the performance of vertices is sometimes allowed to degrade. However, the lower the temperature, the less likely there will be an excursion through a worse performing portion of the search space. Annealing allows my method to escape from a local optimum in favor of finding a better, more global optimum elsewhere. The novelty in my method is in using the partitioned performances to make the global search decisions rather than the scalar performances used in the prior art.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for optimizing a system wherein performances of n design parameters of an objective function modeling the system are represented in a n-dimensional search space, and a set of n+1 vertices are positioned in the search space, and each vertex has an associated one of the performances, comprising:

sorting the vertices in the set in a worst to best performance order;

moving each vertex in the ordered set to a next position if the performance at the next position is better than a current performance of the vertex; and repeating, in a cycle, the sorting and moving, until a termination condition is reached.

2. The method of claim 1 further comprising:

determining a centroid of all vertices of the set except for the vertex being moved; and reflecting the vertex through the centroid to determine the next position of the vertex.

3. The method of claim 2 further comprising:

multiplying a distance that the vertex is reflected by an expansion factor to increase a spatial extent of the set of vertices.

4. The method of claim 1 further comprising:

marking a particular vertex of the set as a best vertex if the performance of the particular vertex is the best performance.

5. The method of claim 4 wherein the best vertex is moved away from the centroid.

6. The method of claim 5 wherein a distance that the vertex is moved is equal to the distance from the vertex to the centroid times an expansion factor.

7. The method of claim 4 further comprising:

moving each vertex of the set, other than the best vertex, toward the best vertex when the performance of the best vertex is unchanged during the cycle.

8. The method of claim 7 wherein a distance that a particular vertex moves is equal to the distance from the particular vertex to the best vertex multiplied by a contraction factor to decrease a spatial extent of the set of vertices.

9. The method of claim 1 further comprising:

positioning a first vertex in the search space at arbitrary coordinates;

incrementing each coordinate of the vertex by a corresponding step size to determine a position of a next vertex; and repeating the incrementing until all n+1 vertices of the set are positioned in the search space.

10. The method of claim 9 wherein the step size is proportional to a corresponding dimension of the corresponding coordinate.

11. The method of claim 1 further comprising:

marking a particular vertex as a best vertex when the performance of the particular vertex is the best performance, and if the performance of the best vertex is unchanged over a predetermined number of consecutive cycles then:

deleting all vertices except the best vertex;

incrementing each coordinate of the best vertex by a corresponding current size to determine a position of a next vertex; and repeating the incrementing until all n+1 vertices of the set are repositioned in the search space.

12. The method of claim 1 further comprising:

increasing the number of vertices in the set if the number of dimensions in the search space is greater than a predetermined number.

13. The method of claim 1 wherein the system further includes a plurality of constraints, and further comprising:

grouping the constraints and the objective function according to a plurality of unique hierarchical levels wherein the group including the objective function has a highest level; and evaluating the performance of a particular vertex, in a low to high order of the levels, according to the groupings of the constraints and the objective function, and assigning the evaluated performance and the associated level to the particular vertex as soon as the evaluated performance is negative, unless the associated level is the highest level, in which case the assigned performance is evaluated from the objective function to partition the search space into a plurality of partitions according to the levels.

14. The method of claim 13 further comprising:

moving a particular vertex within a particular partition only if the performance of the vertex becomes better.

15. The method of claim 13 further comprising:

marking a particular vertex in each partition as a best vertex of the partition if the particular vertex has the best performance; and marking a particular vertex in each partition as a worst vertex of the partition if the particular vertex has the worst performance.

16. The method of claim 15 further comprising:

moving a particular vertex from a particular partition at a lower level to a partition at a higher level only if the particular vertex becomes the best vertex in the partition at the higher level.

17. The method of claim 15 further comprising:

moving a particular vertex from a particular partition at a higher level to a partition at a lower level only if the performance of the particular vertex becomes better than the worst vertex in the partition at the lower level.

18. The method of claim 13 further comprising:

marking a particular vertex as an overall best vertex if the particular vertex has the best performance of any vertex; and marking a particular vertex as an overall worst vertex if the particular vertex has the worst performance of any vertex.

19. The method of claim 18 further comprising:

moving a particular vertex from a particular partition at a lower level to a partition at a higher level only if the particular vertex becomes the overall best vertex.

20. The method of claim 18 further comprising:

moving a particular vertex from a particular partition at a higher level to a partition at a lower level only if the performance of the particular vertex becomes better than the overall worst vertex.

21. The method of any one of claims 13, 14, 15, 16, 17, 18, 19, 20 wherein the partitions include an independent constrained partition having independent performances, a dependent constrained partition having dependent performances, and an unconstrained partition having unconstrained performances.

22. The method of claim 1 further comprising:

grouping the constraints and the objective function according to a plurality of unique hierarchical levels wherein the group including the objective function has a highest level;

evaluating the performance of a particular vertex, in a low to high order of the levels, according to the groupings of the constraints and the objective function, and assigning the evaluated performance and the associated level to the particular vertex as soon as the evaluated performance is negative, unless the associated level is the highest level, in which case the assigned performance is evaluated from the objective function to partition the search space into a plurality of partitions according to the levels;

marking a particular vertex of the set as a best vertex if the performance of the particular vertex is the best performance;

moving each vertex of the set at the same level as the best vertex, other than the best vertex, toward the best vertex when the performance of the best vertex is unchanged during the cycle; and reflecting each vertex of the set at a level lower than the level of the best vertex through the best vertex when the performance of the best vertex is unchanged during the cycle.

23. The method of claim 22 wherein a distance that each vertex is moved and reflected is multiplied by a contraction factor to decrease a spatial extent of the set of vertices.

24. The method of claim 13 further comprising:

dynamically changing the grouping and levels while moving the vertices.

25. The method of claim 13 wherein each move has an associated probability of acceptance based on the performance of each vertex at a current and next positions and a control parameter.

26. The method of claim 13 further comprising:

determining a centroid of all vertices of the set except for the vertex being moved and any vertex having a level that is lower than the level of the vertex being moved; and reflecting the vertex being moved through the centroid to determine the next position of the vertex.

* * * * *